United States Patent [19]
Klein

[11] 4,200,679
[45] Apr. 29, 1980

[54] MICRO-BITS OF EXPANDED FLEXIBLE POLYURETHANES

[76] Inventor: Max Klein, 257 Riveredge Rd., Tinton Falls, N.J. 07724

[21] Appl. No.: 833,643

[22] Filed: Sep. 15, 1977

Related U.S. Application Data

[63] Continuation-in-part of Ser. No. 342,535, Mar. 16, 1973, abandoned.

[51] Int. Cl.² ............................................. B32B 27/40
[52] U.S. Cl. .................................... 428/402; 428/407; 521/918
[58] Field of Search .................... 260/2.5 B; 428/402, 428/407, 523, 357; 521/918

[56] References Cited

U.S. PATENT DOCUMENTS

| | | | |
|---|---|---|---|
| 2,983,692 | 5/1961 | D'Alelio | 260/2.5 B |
| 3,255,127 | 6/1966 | Von Bonin | 260/2.5 B |
| 3,371,053 | 2/1968 | Raskin | 260/2.5 B |
| 3,472,801 | 10/1969 | Lerman et al. | 260/2.5 B |
| 3,607,999 | 9/1971 | Corbett et al. | 428/407 |
| 3,630,820 | 12/1971 | Leach | 428/402 |

*Primary Examiner*—William R. Dixon, Jr.
*Attorney, Agent, or Firm*—A. A. Orlinger

[57] ABSTRACT

A polyurethane structure prepared by the comminution of a flexible polyurethane foam in the presence of a compatible protective cooling fluid.

6 Claims, 7 Drawing Figures

MICRO-BITS OF EXPANDED FLEXIBLE POLYURETHANES

This application is a continuation-in-part Application of Ser. No. 342,535, filed Mar. 16, 1973 (now abandoned).

BACKGROUND OF THE INVENTION

Various attempts have been made to produce particulate synthetic polymers derived from expanded polymers or polymer solutions for use in the paper-making industry as modifiers to improve or modify the properties of the fibrous paper products. These particulate synthetic polymer products of the prior art have met with limited commercial success either because of cost or incompatibility with standard paper-making processes and formulations. Generally, the use of a particulate polymer in a fibrous paper formulation results in decreased tensile and tear strength properties of the modified product.

One attempt to use a particulate synthetic polymer as a modifier in a paper product is described in U.S. Pat. No. 3,038,867. A "semi rigid" urea-formaldehyde foam is prepared and disintegrated. In order to process a mixture of this disintegrated aminoplast resin and wood pulp on paper-making equipment it was necessary to de-aerate the mixture. No physical properties on tensile or tear strength are reported. However, the required de-aeration step indicates that the disintegrated foam contained sufficient cell structure to entrap air and cause floatation of the disintegrated foam from the wood pulp component of the paper-making formulation which in turn caused the processing problem reported in Example 1 of the patent.

A second attempt to produce a particulate polymeric modifier is described in U.S. Pat. No. 3,597,312. A particulate or fibrous polystyrene is prepared according to this patent by precipitating a solution of polystyrene in a non-solvent such as pentane. The resulting precipitate is recovered and extracted with non-solvent to remove entrapped solvent; the extraction step is then followed by drying of the polymer to remove the non-solvent. This process is costly and to some extent dangerous because it involves the use and recovery of large quantities of potentially explosive and relatively expensive organic solvents.

Another attempt to produce a particulate foamed urea-formaldehyde resin suitable for use in paper making is described in U.S. Pat. No. 3,164,559. At this point the art had come to recognize that granular particulates exhibited little or no mechanical binding attraction for the fibrous substances with which they were to be combined. The patent describes an attempt to use a flexible urea-formaldehyde resin as the starting material for making a paper additive. The inventors solved the problem of grinding such a flexible material by compressing it under temperature and pressure until such densification eliminated the resilient property of the polymer which interfered with the grinding operation. The product of this process is deficient in that its addition to a paper-making formulation caused a major reduction in tensile and breaking strength.

SUMMARY OF THE INVENTION

This invention is that of a novel polymeric structure, termed a polyurethane micro-bit, and a process for preparing it by comminuting a flexible polyurethane foam in the presence of a fluid, usually water.

The structure of the products of this invention is adapted for use in paper-making formulations and processes to improve the tear and tensile strength of the modified paper.

DETAILED DESCRIPTION OF THE INVENTION

The products of this invention are prepared from flexible polyurethane foams. The preparation and properties of flexible polyurethane foams are well known and are based on the reaction of a di-isocyanate or other polyisocyanate with a polyol and a blowing agent (usually water).

The preparation of flexible polyurethane foams and their properties are described in the "Handbook of Foamed Plastics," Bender, Rene J., Section X, pp. 137–236, Lake Publishing Corporation, Libertyville, Ill. (1955); "The Development and Use of Polyurethane Foams," Doyle, E.N., pp. 223–256, McGraw Hill Book Company (1971); and "Polyurethanes: Chemistry and Technology," Saunders and Frisch, Chapter VII, Part II, InterScience Publishers (1964).

The flexible polyurethane foams useful in the practice of this invention are further characterized by excellent recovery after 75% deflection (approximately less than 1% loss in height). The mechanical properties of flexible polyurethane foams are determined in accordance with ASTM D-1564-64T.

The density of the flexible polyurethane foams useful in the practice of this invention should not be greater than 6.0 pounds per cubic foot; preferably in the range of from about 3.0 pounds per cubic foot to about 1.0 pound per cubic foot.

Flexible polyurethane foams are soft, resilient materials and thus they are difficult to comminute to a size adapted for use in the paper industry. The novel structures of this invention are prepared by feeding shredded pieces of a flexible polyurethane foam into a confined comminuting zone while simultaneously introducing sufficient cooling and dispersing medium, generally water, into said comminuting zone to prevent its temperature from reaching a level that would adversely affect the contents of the comminuting zone or the comminuting process and equipment.

Figure 1:
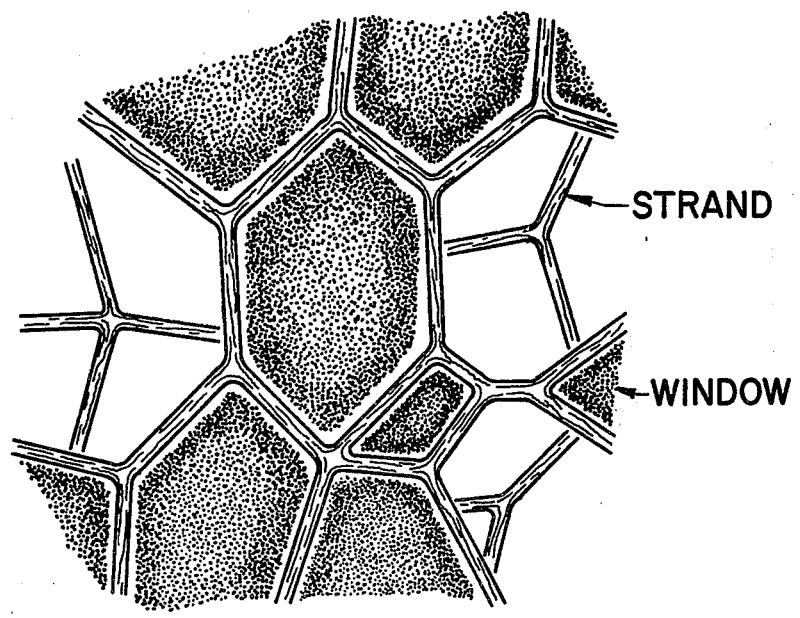
FIG. 1 is an illustration of a section of several polyurethane cells depicting the strand and window portions of the cell.

The structure of a flexible polymeric urethane foam may be generally described as an interconnected mass of bubbles which have been distorted into polyhedra form. The polymer is distributed between the walls of the bubbles and the lines where bubbles intersect, with most of the polymer at the intersections. For the purpose of this description the bubbles are called "cells", the lines of cell intersections are called "strands" and the walls between cells are called "windows". FIG. 1 illustrates the structure of a flexible polyurethane foam and its just defined component parts.

Figure 5:
FIG. 5 is a SEM, at a magnification of 10,000, of the central left-hand portion of FIG. 4 showing the fluted structure emanating from the strand portion of the particulate product and running vertically downwardly towards the remnant of the cell window portion of a product of this invention.
Figure 6:
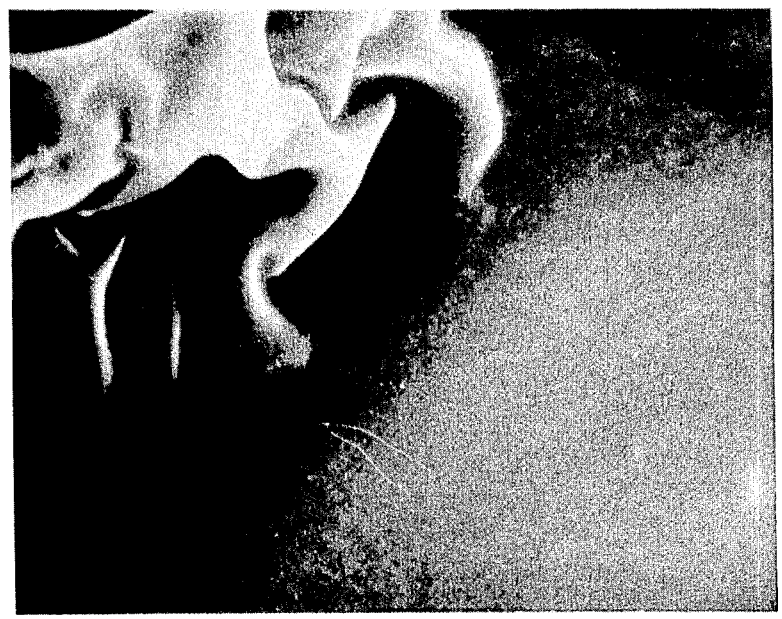
FIG. 6 is a SEM, at a magnification of 15,000, showing the end of the fluted structure of FIG. 5 where it merges into the remnant of the cell window portion of a particulate product of this invention.
Figure 7:
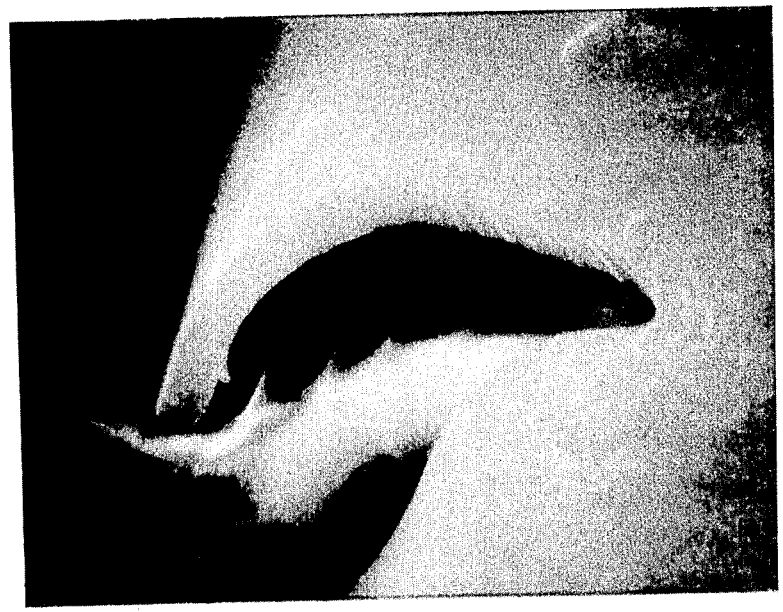
FIG. 7 is a SEM, at a magnification of 5,000, showing the thickness of the remnant of the cell window of a product of this invention.

Comminution of a flexible polyurethane in accordance with the process of this invention produces a novel structure which consists of one or more strand portions to which are attached fragments of the windows. The fragments of the windows produce a series of jagged hook-like projections and indentations on the strand portions. Examination of the drawings shows fluted areas, for example, as seen in FIG. 5, which are believed to have been caused by tearing of the polymeric structure. For the purpose of this description, this broken cell structure is termed a "polyurethane micro-bit".

The products of this invention are superior to the particulate synthetic polymers of the prior art because the broken portions of the cell windows provide a series of hook-like projections, indentations and flutes which serve to provide attachment points for the fibers of a paper and thus anchor the polyurethane micro-bit into the matrix of the paper's intertwined cellulosic fibers.

The polyurethane micro-bits of the invention are prepared by feeding pieces of shredded flexible polyurethane foam and water into a confined comminuting zone, having a feed inlet to it, repeatedly impelling the resulting mixture of the starting pieces of polyurethane in the water through a circular path by repeated impact on them in the water by a plurality of impact surfaces spaced apart from one another and rotated around the axis of said circular path at from about 4,700 to about 8,000 revolutions per minute, and at the same time by said impact surfaces driving said pieces to and against corner-shaped edges of a dispersed plurality of from substantially circular orifices (a) having a diameter of from about 0.102 to about 3.175 millimeters (i.e. mm.) to substantially rectangular orifices from about 0.254 to about 3.175 mm. in width by from about 3.81 to about 12.7 mm. in length, and (b) being arranged in screening array in an arcuate plane spaced radially out of range of said impact surfaces to an extent that need be only sufficient to avoid collision between said orifices and said impact surfaces, as from about 0.508 to 1.016 mm., and thereby repeatedly tearing, ripping and shearing polyurethane micro-bits from the pieces of flexible polyurethane; said fed-in water being so proportioned to said fed-in pieces of flexible polyurethane foam to prevent the content of the comminuting zone from reaching a temperature that would adversely affect the integrity of said starting pieces and/or the desired micro-bits.

The preparation of these polyurethane micro-bits, and so also the method of the invention, can be conducted by disintegrating the flexible polyurethane foam in a comminuting machine (such as that produced by Fitzpatrick Company, of 832 Industrial Drive, Elmhurst, Illinois 60126, according to their Bulletin No. 152, copyright 1968) using the broached fixed blades (identified therein by "Code DS-225") to replace the blades or other comminuting elements, mounted for rotation in the comminuting chamber model DAS06, both shown on that Bulletin's page 5. That chamber is liquid-tightly capped, for example, by a cover such as shown in their Code M44D6 or Code MA44D6 (upper half of page 3 of their Bulletin 152).

That model DAS06 comminuting chamber is rectangular in horizontal cross-section and has a pair of opposed parallel, entirely vertical walls integrally joined at each of their opposite ends by a separate one of a pair of opposed vertically arcuate walls each with its convex face exposed to the exterior.

Sixteen identical, slat-shaped comminuting arms are separately removably but fixedly carried with their snugly adjacent to one another bases encircled about, and keyed to, the operating shaft and intermediate its free outer mounting ends. These arms extend radially out from the shaft (e.g. 127 mm. from its axis to the outer end of each arm) with the first of each consecutive four of them extending horizontally toward one arcuate wall, the second of each four extending vertically, the third four of them extending toward the other arcuate wall, and the fourth four of them extending vertically downward.

Each arm is rectangular in cross-section in a plane running through the entire length of the shaft's axis and of that arm, and of each arm 180° removed from it. The outer end of each arm meets at right angles with its two wider sides (25.4 mm. width) and its narrow or impact side (9.525 mm. wide) facing the direction of rotation. That narrow side also meets at right angles with the two wider sides which are parallel to one another for most of their width and with the trailing third of their surfaces tapering to one another and terminating in a knife edge of their trailing end.

Each free exposed end of the shaft extends through its respective stuffing box in its neighboring one of the two parallel vertical walls on through a bearing carried on a respective trunnion affixed to the machine's foundation and spaced outwardly away from the respective wall. A driving pulley is mounted on each end of the shaft extending outwardly from its respective mounting trunnion.

The bottom of the comminuting chamber is an exchangeable dish-shaped, arcuate screen curved convexly downward with an inside radius (from the axis of the operating shaft) equal to the length of a comminuting arm plus 0.762 mm. clearance. The screen's overall rectangular peripheral opening has such dimensions and shape to enable it to be removably fitted in a liquid-tight engagement with the bottom of the four walls of the comminuting chamber.

The screen has staggered rows of, for example, circular holes varying in diameter as from 0.102 to about 3.175 mm. and closely spaced to one another with sufficient space between them for the screen to hold up under working conditions.

Except for its starting material feed hopper inlet at one side of it, the rest of the chamber's cover is arcuate and convex upwardly with a radius (from the axis of the operating shaft) sufficient for the rotating arms to have a 0.762 mm. clearance from the inwardly facing surfaces of a plurality (e.g. three) pre-breaker bars (about 20.32 cm. long and 6.35 mm. wide) protruding for 3.175 mm. along their entire length into the interior of the comminuting chamber, and extending spaced apart from one another and parallel to the axis of the operating shaft.

The selected driving pulley on the operating shaft is connected by driving belts extending from a motor shaft drive pulley and can be operated at speeds embracing the range of from about 4,700 to about 8,000 r.p.m., and more effectively from about 5,000 to about 7,500 r.p.m.

The invention is illustrated by but not restricted to the following example.

EXAMPLE 1

Approximately 400 liters of flexible polyurethane foam in the form of pieces about 1 inch × 1 inch × ½ inch in size having a density of approximately 2 pounds per cubic foot were comminuted in a comminuting machine (as described on page 6, line 6 to page 9, line 15) equipped with an input feeder approximately 10 cm. in diameter by 7½ cm. long and having a bottom arcuate screen with rectangular slots 12.7 mm. long by 0.25 mm. wide and arranged in a herringbone array. The rotor was set to run at approximately 7,500 r.p.m. and the feeder set to charge the flexible polyurethane foam pieces at a rate of about 35 liters per every 5 minutes. The flexible polyurethane foam pieces to be introduced into the feeder were wetted with sufficient water to substantially cover their outer surface. Simultaneously, water was injected into the comminuting zone through 2.16 mm. diameter jet orifices at a rate of approximately 7.6 liters per minute. The mixture of polyurethane micro-bits leaving the bottom screen of the comminuting chamber was collected in open drums with bottom drain plugs, wherein the free water settled to the bottom and the polyurethane micro-bits with the bound water held by them in a proportion of 1 part of polyurethane micro-bits to 3 parts of water, due to untrapped air, rose on top of the free water. The polyurethane micro-bits were recovered and dried in an oven at a temperature of 210° F.

Hand sample paper sheets prepared by mixing the polyurethane micro-bits with a usual water suspension of bleached wood pulp in the usual test made in papermaking laboratories produced a product having significant improvements in tear and tensile strength over that of comparable sheets made with the bleached wood pulp alone in the same concentration of that of the pulp taken together with the polyurethane micro-bits. The properties of these papers are set forth below.

TABLE 1

| | Blank | 5% B | 10% B | 40% B | 80% B |
|---|---|---|---|---|---|
| Tensile Strength - lb./in. | 19.5 | 25.4 | 18.8 | 13.2 | 10.3 |
| Tear Strength - lb./in. | 122 | 138 | 176 | 172 | 165.3 |
| Mullen | 46 | 35 | 48 | 31 | 34 |
| Brightness - % | 81.7 | 79.4 | 79.3 | 77.8 | 76.0 |
| Opacity - % | 90.1 | 87.2 | 88.7 | 90.3 | 91.3 |
| Basis Wt. - lbs./1,300 ft.$^2$ | 81.5 | 84.6 | 87.1 | 108.4 | 130.6 |
| Caliper - in. × $10^3$ | 8.5 | 10.0 | 11.1 | 16.4 | 23.6 |

B = Percentage of polyurethane micro-bits.

Figure 2:
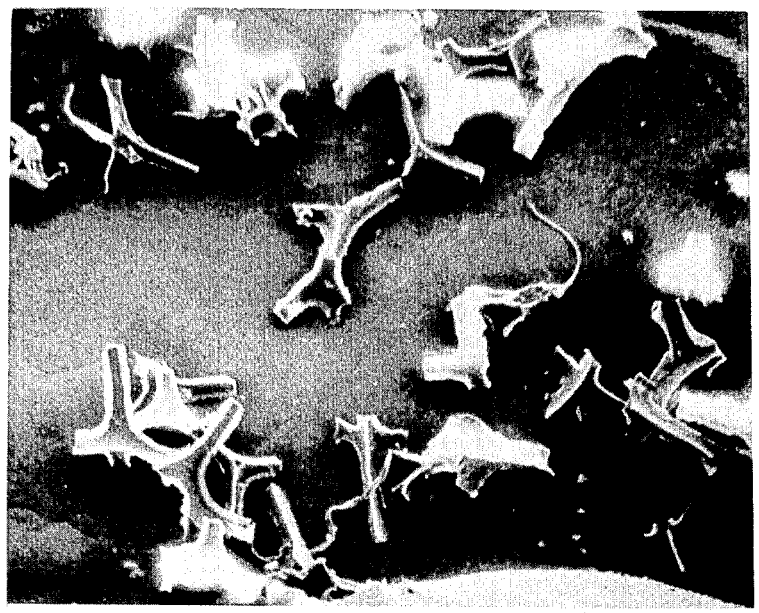
FIG. 2 is a SEM (scanning electron microscope) photograph, at a magnification of 200, of the particulate products of this invention.
Figure 3:
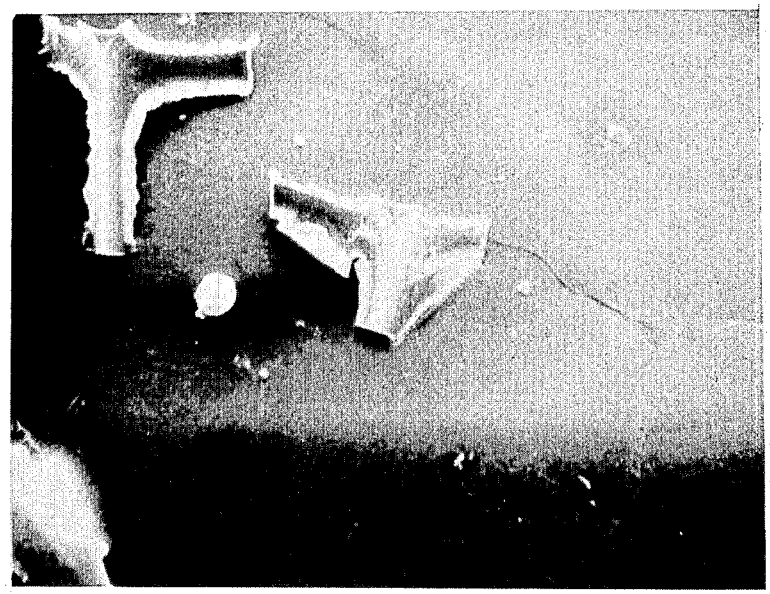
FIG. 3 is a SEM of two particles of a product of this invention at a magnification of 200.
Figure 4:
FIG. 4 is a SEM of the particulate product shown in the center portion of FIG. 3. The magnification is 500.

FIG. 2 shows the overall structure of the polyurethane micro-bits of this invention. They range in size from about 160 to about 100 micron in the overall maximum dimension. They exhibit a relative similarity from micro-bit to micro-bit and the micro-bits may appear as tripodal particles with generally uneven length legs, as seen in FIGS. 2 and 3. The overall dimensions of the micro-bits can be controlled by changes in the polyurethane formulation made to effect the cell size.

FIG. 3 shows the ragged peripheral boundaries of the polyurethane micro-bits which have resulted from the fracture and tearing of cell windows. These two mechanisms of cell window destruction are evidenced by the fluted tear line structure of the central micro-bit's right-hand boundary versus the jagged fracture line of the remaining boundaries, as seen in FIG. 5''. Modification of the mechanism of cell window destruction and the peripheral boundaries should be easily affected by changes in the polyurethane foam formulation.

The polyurethane micro-bits of this invention when admixed in, or serving as a filter medium, are effective to remove phenol from aqueous solution, e.g. streams of industrial effluent, and also from gaseous streams.

While the invention has been explained by detailed description of certain specific embodiments of it, it is understood that various modifications and substitutions may be made in them within the scope of the appended claims which are intended also to cover equivalents of these embodiments.

I claim:

1. Polyurethane micro-bits prepared from a flexible polyurethane foam and comprising, as best seen under magnification:
    (a) broken and inter-connected strand portions from adjacent cells of said flexible foam;
    (b) said broken and interconnected strand portions being tripodal particles with generally uneven length legs;
    (c) said strand portions having hook-like projections, indentations and flutes extending therefrom, said hook-like projections, indentations and flutes having been formed by the destruction of the cell windows of said flexible foam; and
    (d) said strand portions being characterized by a substantially total absence of intact cell windows.

2. Polyurethane micro-bits of claim 1, wherein said micro-bit is prepared from a flexible polyurethane foam having a density less than 6.0 pounds per cubic foot.

3. Polyurethane micro-bits of claim 1, wherein said micro-bit is prepared from a flexible polyurethane foam having a density from about 1.0 pound to about 3.0 pounds per cubic foot.

4. An aqueous slurry of the micro-bits of claim 1 wherein said slurry contains from about 1.0 to about 2.0 percent by weight of said micro-bits.

5. An aqueous slurry of the micro-bits of claim 2 wherein said slurry contains from about 1.0 to about 2.0 percent by weight of said micro-bits.

6. An aqueous slurry of the micro-bits of claim 3 wherein said slurry contains from about 1.0 to about 2.0 percent by weight of said micro-bits.

* * * * *